(12) United States Patent
Placik

(10) Patent No.: US 9,017,080 B1
(45) Date of Patent: Apr. 28, 2015

(54) SYSTEM AND METHOD FOR TEACHING INJECTION TECHNIQUES OF THE HUMAN HEAD AND FACE

(76) Inventor: Otto J. Placik, Arlington Heights, IL (US)

( * ) Notice: Subject to any disclaimer, the term of this patent is extended or adjusted under 35 U.S.C. 154(b) by 1962 days.

(21) Appl. No.: 12/201,201

(22) Filed: Aug. 29, 2008

(51) Int. Cl.
G09B 23/28 (2006.01)
G09B 23/30 (2006.01)

(52) U.S. Cl.
CPC .............. G09B 23/285 (2013.01); G09B 23/30 (2013.01)

(58) Field of Classification Search
USPC ........................... 434/267, 269, 270, 272, 274
See application file for complete search history.

(56) References Cited

U.S. PATENT DOCUMENTS

| | | | | |
|---|---|---|---|---|
| 2,988,823 A * | 6/1961 | Rosenbloom | ................. | 434/272 |
| 3,339,290 A * | 9/1967 | Doyle | ........................... | 434/267 |
| 3,722,108 A | 3/1973 | Chase | | |
| 3,789,518 A | 2/1974 | Chase | | |
| 3,855,714 A * | 12/1974 | Block | ........................... | 434/269 |
| 4,209,919 A * | 7/1980 | Kirikae et al. | ................. | 434/270 |
| 4,481,001 A * | 11/1984 | Graham et al. | ............... | 434/267 |
| 4,596,528 A * | 6/1986 | Lewis et al. | .................... | 434/270 |
| 4,708,836 A * | 11/1987 | Gain et al. | .................... | 264/40.1 |
| 4,773,865 A * | 9/1988 | Baldwin | ....................... | 434/268 |
| 5,411,437 A | 5/1995 | Weber et al. | | |
| 5,505,623 A * | 4/1996 | Chernack et al. | ............. | 434/272 |
| 7,621,749 B2 * | 11/2009 | Munday | ........................ | 434/262 |

* cited by examiner

*Primary Examiner* — Melba Bumgarner
*Assistant Examiner* — Joseph B Baldori
(74) *Attorney, Agent, or Firm* — LaMorte & Associates, P.C.

(57) ABSTRACT

An anatomical model assembly of the human head for use in teaching medical personnel. The anatomical model has an inner base that is shaped as part of the human skull. A first layer of material covers the base. The first layer of material provides a visual indication of at least some muscle groups contained within a human head. A second layer of material is provided that covers the first layer. The second layer of material has an exterior that is shaped with at least some human facial features. The second layer of material and the first layer of material are separate, unattached layers. The material selected for the first layer mimics the suppleness of muscle. The material selected for the top second layer mimics the feel and elasticity of skin. The result is an anatomical model that can be used to accurately teach, plan and practice medical procedures.

12 Claims, 4 Drawing Sheets

SYSTEM AND METHOD FOR TEACHING INJECTION TECHNIQUES OF THE HUMAN HEAD AND FACE

BACKGROUND OF THE INVENTION

1. Field of the Invention

In general, the present invention relates to anatomy teaching aids. More specifically, the present invention relates to teaching aids designed to help teach the proper techniques for subdermal injections.

2. Description of the Prior Art

Physicians make injections under the skin of a patient for a great many reasons. For instance, if a physician is injecting a medication into a patient's bloodstream, the physician may insert a hypodermic needle directly into a vein. If a physician is trying to numb an area of the body, a physician may inject an anesthetic agent into tissue surrounding a particular nerve. Still in other applications, a surgeon may inject inert material, such as collagen, into fatty tissue under the skin to achieve a cosmetic effect.

Making an injection into a limb is a relatively simple procedure that is learned by first year medical students. The positions of the veins, arteries, muscles and nerves in the various limbs are well known and vary little from patient to patient. Although most medical personnel learn limb injection techniques by directly injecting patients, some training devices do exist. The training devices are typically plastic and rubber models of a limb, such as an arm. The training devices are used to learn the anatomy of a limb and to practice the location and depth of different injections. Such limb injection training devices are exemplified by U.S. Pat. No. 3,722,108 to Chase, entitled Injection Training Aid, and U.S. Pat. No. 3,789,518 to Chase, entitled Simulated Human Limb.

Making injections into the torso of a body are far more complex than those made in a limb. If an injection into a core part of the body is not precise, the needle may fail to reach the targeted tissue. Of more concern, an over-inserted needle or a misguided needle may puncture an internal organ or blood conduit, thereby causing internal bleeding. Physicians typically learn body core injection techniques while under close guidance by an experienced physician and/or practice on a cadaver. Training devices exist for developing the most rudimentary levels of experience. These training devices are little more than dummies with organ location maps attached to the outside of the body. Such prior art training devices are exemplified by U.S. Pat. No. 5,411,437 to Weber, entitled Medical Training Aid.

Perhaps the most difficult places on the body to practice and learn proper injection techniques is on the face and head. The skin and muscles on the face and head are very thin. Accordingly, the dermis and subcutaneous tissue layer are thin and hard to differentiate. Injections are further complicated by the complex contours of the face and head. Furthermore, a great many nerves and blood vessels run through the face and head. This anatomy also varies significantly depending upon the facial features of the patient.

In the practice of cosmetic surgery, a physician must make numerous injections to the face. Injections are made to either numb the face for a procedure or introduce a beneficial compound, such as collagen or Botox® under the skin. Physicians who practice cosmetic surgery cannot learn by trial and error on real patients. Likewise, practice on cadavers only has limited benefit because a cadaver lacks the skin resiliency and muscle suppleness of living tissue. Physicians must therefore learn from observation of other skilled physicians or by injecting models of fake skin. Models of fake skin are trays of simulated skin material into which a physician can practice injections. Such prior art practice devices are exemplified by U.S. Pat. No. 4,481,001 to Graham, entitled Human Skin Model For Intradermal Injection Demonstration Or Training. However, such injection practice devices are flat and do not teach a physician how to deal with the contours of the face or the anatomy present below the skin across the face.

A need therefore exists for a teaching aid for plastic surgeons and cosmetic surgeons that accurately models the face and head so that the physician can practice and learn injection techniques for these anatomical areas. This need is met by the present invention as described and claimed below.

SUMMARY OF THE INVENTION

The present invention is an anatomical model assembly of the human head for use in teaching medical personnel certain medical procedures. The anatomical model has an inner base that is shaped as a human skull or part of the human skull.

A first layer of material covers the base. The first layer of material has an exterior on which is provided a visual indication of at least some muscle groups contained within a human head. The visual indication can be either printed onto the first layer or be molded into the first layer.

A second layer of material is provided that covers the first layer. The second layer of material has an exterior that is shaped with at least some human facial features. The second layer of material and the first layer of material are separate, unattached layers.

The material selected for the first layer mimics the suppleness of muscle. The material selected for the top second layer mimics the feel and elasticity of skin. The result is an anatomical model that can be used to accurately teach, plan and practice medical procedures for the head and face, such as injections, cosmetic procedures, cosmetic surgery and reconstructive surgery.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Figure 1:
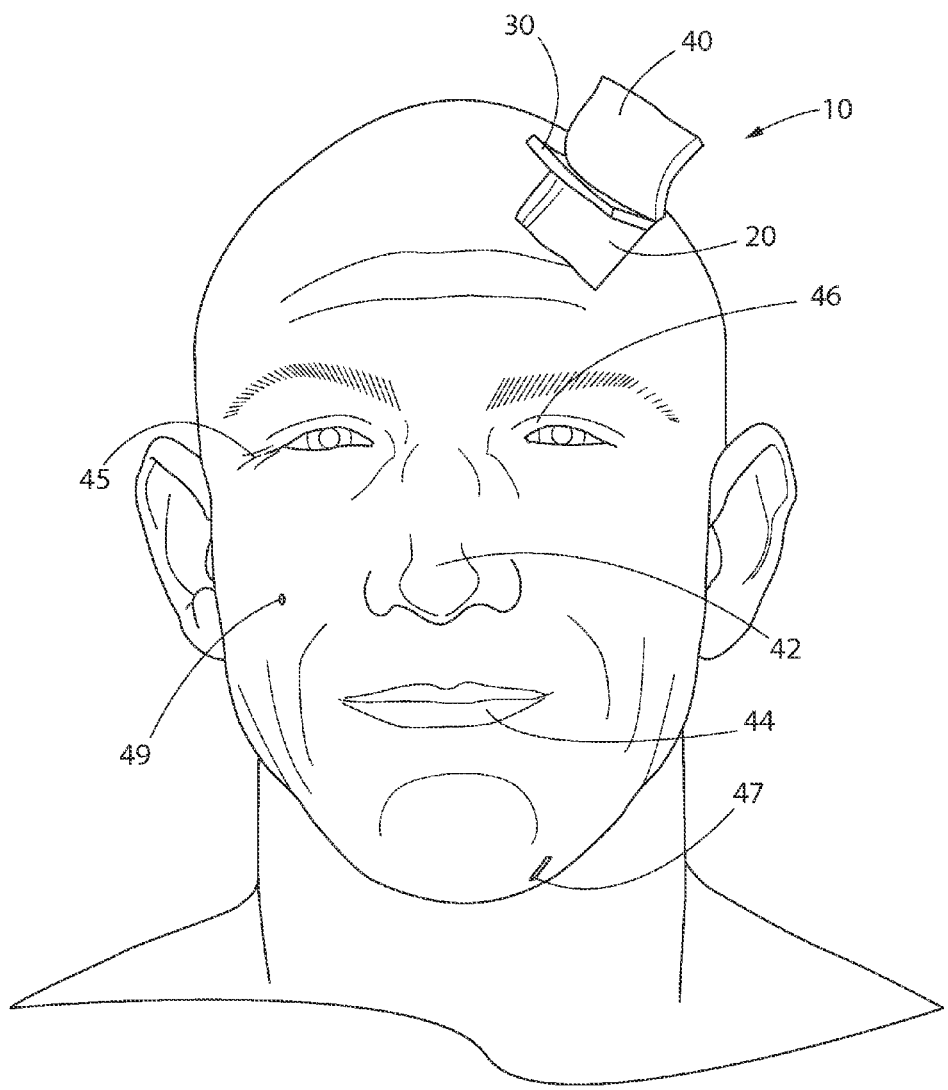
FIG. 1 is a perspective view of an exemplary embodiment of the present invention.
Figure 2:
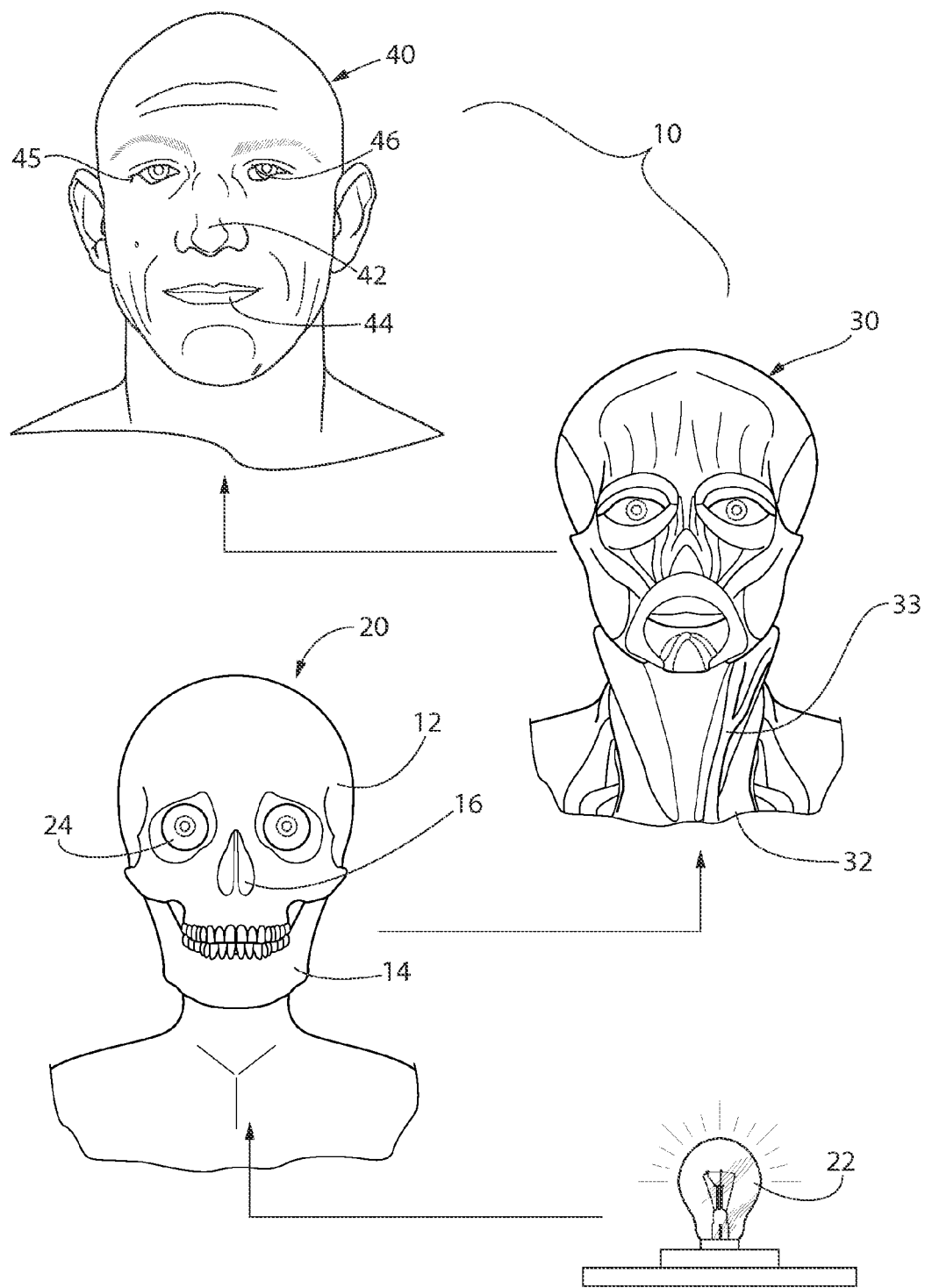
FIG. 2 is an exploded view of the embodiment of FIG. 1.
Figure 3:
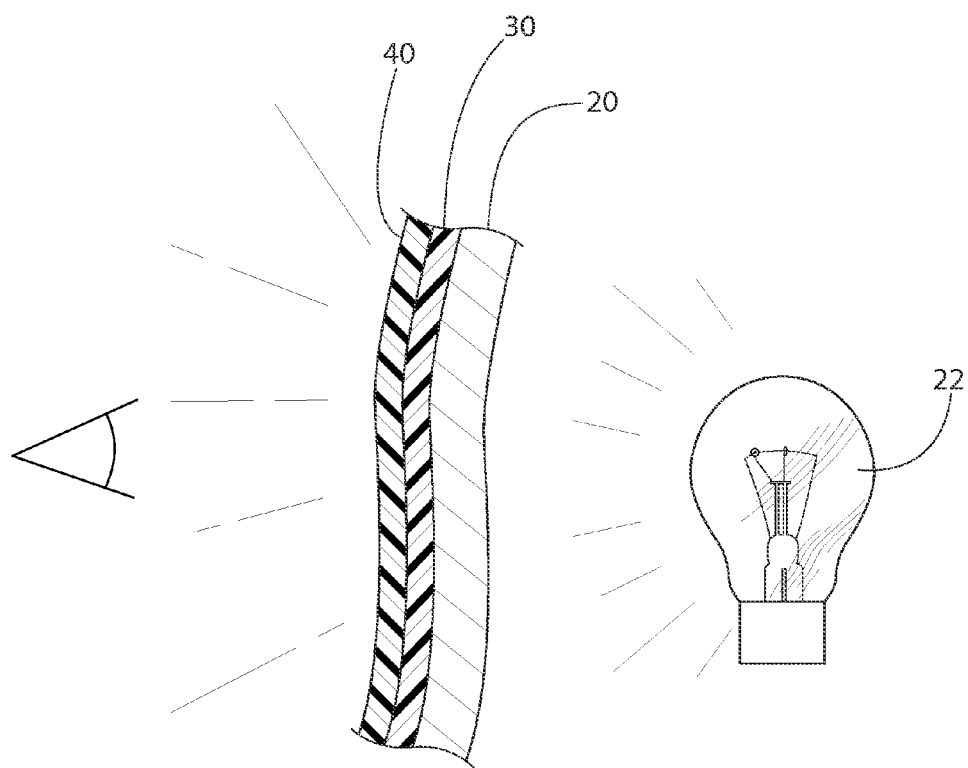
FIG. 3 is a cross-sectional view of a portion of the exemplary embodiment of FIG. 1.

Referring to FIG. 1 in conjunction with both FIG. 2 and FIG. 3, an anatomical model 10 is shown of the human head and face. The anatomical model 10 has a layered construction. In the center of the anatomical model 10 is a plastic reproduction of the human skull 12, mandible 14, and nose cartilage 16, herein referred to as the bone base 20. The bone base 20 is preferably fabricated from a hard material, such as plastic. Acceptable plastics, include, but are not limited to, polyethylene terephthalate (PET), polyvinyl chloride (PVC), high density polyethylene (HCPE), polypropylene (PP), polycarbonate and hard urethane. Each of these materials is capable of being molded into the shape of the bone base 20. Such plastics cannot be readily pierced by the point of a hypodermic needle and therefore simulate real bone. The skull 12, mandible 14, and nose cartilage 16 are anatomically correct for either a man or a woman. In the preferred embodiment, the skull 12, mandible 14 and nose cartilage 16 would be configured as that of an average middle-aged woman to simulate the average cosmetic surgery patient.

Preferably, the plastic used in the construction of the bone base 20 is mixed to be somewhat translucent. A light source 22 is present inside the bone base 20. The light source 22, therefore, internally illuminates the bone base 20. Light passes through the bone base 20 and internally illuminates the subsequent layers, as will be explained.

Fake eyes 24 are glued in place on the bone base. The fake eyes 24 can be either plastic or glass.

A muscle mask 30 is placed over the bone base 20. The muscle mask 30 is molded from elastomeric material and contains an anatomically correct representation of the muscle and subcutaneous tissue that is present in the head and neck. On the muscle mask 30, the muscle and subcutaneous tissue are not separate, but are rather part of a common molding. The representation of muscle and subcutaneous tissue is molded onto the exterior of the muscle mask 30. Consequently, the muscle mask 30 does not reproduce hidden muscle and tissue, but only models how the face and head would appear if the skin were removed. All the major muscle and tissue structures that lay under the skin are represented. Fine detail is preferably molded into the muscles that control facial expressions, such as the epicranius, frontalis, occipitallis, orbicularis oris, zygomaticus major, levator labii superioris, depressor labii inferioris, buccinator, mentalis, platysma, risorius and orbicularis oculi.

In addition to the major muscle and tissue structures, the major nerves and blood vessels can be molded into the muscle mask 20. Alternatively, nerves and blood vessels 33 can be painted or otherwise printed onto the exterior of the muscle mask 30. Preferably, major blood vessels are molded features, while minor blood vessels and nerves are printed features.

The muscle mask 30 can be molded from any elastomeric material, such as foam rubber and silicone rubber. However, in the exemplary embodiment, a highly elastic elastomeric gel is used. Furthermore, although the muscle mask 30 can be colored to help differentiate various anatomical features, i.e. muscles, nerves, veins and arteries, the muscle mask 30 is preferably translucent to light. In this manner, the light that internally illuminates the bone base 20 also internally illuminates the muscle mask 30.

Translucent elastomeric gels that have a suppleness similar to that of real muscle can be obtained from mixing a triblock copolymer with mineral oil. The preferred triblock copolymers include poly(styrene-ethylene-butylene-styrene), poly (styrene-ethylene-propylene-styrene) or polystyrene-ethylene-ethylene-propylene-styrene).

By varying the amount of mineral oil added to the composition, the softness of the resulting gel can be controlled with great accuracy. It has been found that a triblock copolymer mixed with between 5% to 8% mineral oil makes a good simulation of muscle tissue. Furthermore, elastomeric gel materials made in this manner are extremely elastic and resistant to tearing. Accordingly, by molding the muscle mask 30 from such material and providing a bottom neck opening 32, the muscle mask 30 can easily be stretched over the bone base 20.

A skin mask 40 is also provided. The skin mask 40 can also be molded from any elastomeric material, such as foam rubber or silicone rubber. However, the exemplary embodiment uses elastomeric gel. The elastomeric gel material being used contains a higher percentage of mineral oil to provide the skin mask 40 with more elasticity and a higher degree of suppleness than the underlying muscle mask 30.

The thickness of the skin mask 40 varies from point to point to mimic the average skin thickness on the face and head. For example, the skin mask 40 is thicker at the chin than it is at the forehead, as is true for real skin.

The exterior of the skin mask 40 is molded to have all the facial features, such as the nose 42, lips 44 and even eyelids 46. Furthermore, skin features and defects can be molded onto the exterior of the skin mask 40, such as wrinkles 45, scars 47, and moles 49. Again, it is preferred that the skin mask 40 be made translucent so that it is internally illuminated from the light source 22 within the bone base 20.

The skin mask 40 has a bottom opening 48. This enables the skin mask 40 to be pulled and stretched over the muscle mask 30 to complete the injection model. The skin mask 40 has the same feel as real skin. The skin mask 40 can therefore be pulled and pinched in the same manner as real skin. Furthermore, the muscle mask 30 under the skin mask 40 provides the skin mask 40 with realistic contours and an authentic feel to a physician's hand.

The skin mask 40 can be stretched over the muscle mask 30 and left in that condition. This, however, produces a boundary layer between the skin mask and the muscle mask 40 that may gather injected fluids. To prevent the boundary layer from occurring, the muscle mask 30 can be sprayed with an adhesive prior to the application of the skin mask 40. The adhesive bonds the material of the muscle mask 30 to the material of the skin mask 40 and eliminates the boundary layer.

Figure 4:
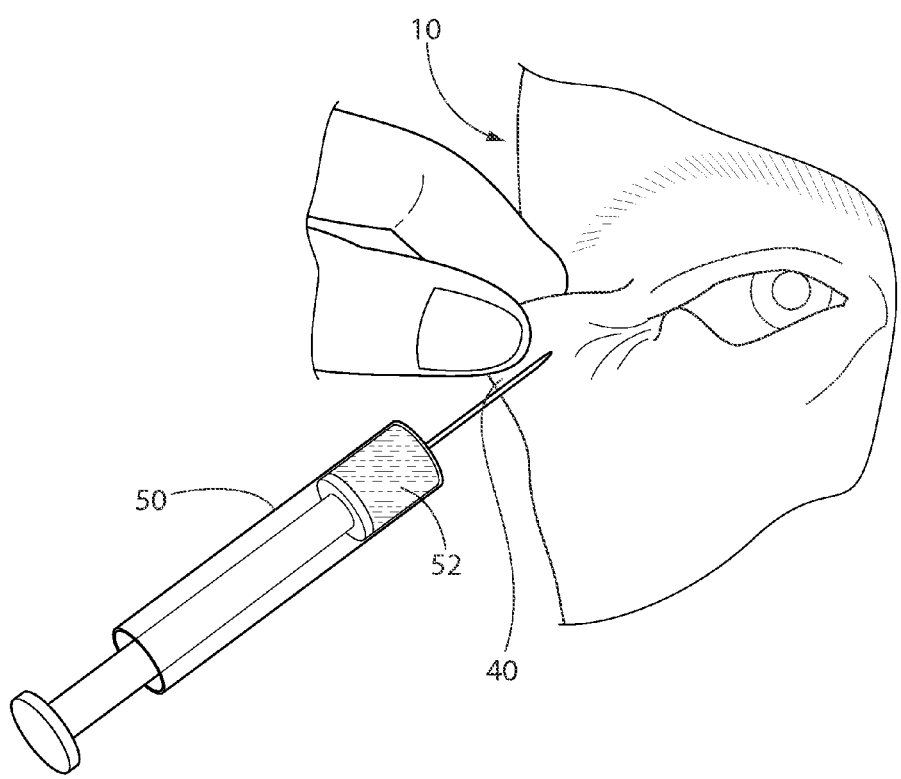
FIG. 4 is an enlarged view of a hypodermic needle injecting training fluid into a portion of the present invention.

Referring now to FIG. 4, it can be seen that in order to utilize the anatomical model 10 for practicing injections, a physician injects a hypodermic needle 50 into the anatomical model 10. Since the anatomical model 10 is internally illuminated, a physician can easily see the position of the tip of the hypodermic needle 50 in relation to elements of the subfacial anatomy. Furthermore, a physician can pinch the skin mask 40, pull the skin mask 40, and press the skin mask 40 in the same manner as real skin. Injections that require such manipulations of the skin can therefore be practiced.

In addition to practicing the mechanics and proper location of injections, a physician can also practice injection dispensing techniques. A training fluid 52 is provided. The training fluid 52 is preferably opaque and may come in several viscosities to simulate different injection materials, such as collagen or silicone. The training fluids 52 can be injected into the material of the skin mask 40. Since the training fluid 52 is opaque, it is easily seen in the internally illuminated translucent skin mask 40. A physician can practice injecting under wrinkles, around moles and into the eyelids or lips. The injected material displaces the material of the skin mask 40 in the same manner that it would skin. Accordingly, many cosmetic injection procedures can be accurately practiced.

Once a skin mask 40 has been used for practice, it can be removed and replaced. If the skin mask 40 is bonded to the muscle mask 30, both can be replaced. The skin mask 40 and the muscle mask 30 both contain between one half pound and one pound of elastomeric material. At current costs, elastomeric gel can be fabricated at between $1-$4 per pound. Accordingly, skin masks and muscle masks can be made very inexpensively.

Referring now to all figures, it is understood that the anatomical model 40 contains a layered construction comprised of a bone base 20, a muscle mask 30 and a skin mask 40. This construction mimics the anatomy of the face, which as a bone layer, a muscle layer and a skin layer. Accordingly, the anatomical model 40 can be used to practice various facial surgical techniques. The skin mask 40 can be readily cut by a scalpel and peeled away from the muscle mask 30. Likewise, the muscle mask 30 can be cut and peeled away from the bone base 20. Furthermore, the material of the muscle mask 30 and the skin mask 40 can be stitched together in the same manner as real muscle and skin tissue using standard suture materials. As a result, the anatomical model 10 can be used to plan and practice various cosmetic and reconstructive surgeries.

After any procedure, if necessary, the skin mask 40 and/or the muscle mask 30 can be removed and replaced. It should be understood that muscle masks and skin masks can be made for different types of people, such as male/female, old/young or fat/thin. The anatomical model 10 can therefore be customized to the needs of a particular physician.

It will be understood that the embodiment of the present invention that is illustrated and described is merely exemplary and that a person skilled in the art can make many variations to that embodiment. For example, the muscle mask can be molded directly around the bone base, rather than being a removable mask. Likewise, the muscle mask may be molded from material, such as foam rubber or Styrofoam that is supple, but not elastic. All such variations, modifications and alternate embodiments are intended to be included within the scope of the present invention as defined by the claims.

What is claimed is:

1. An anatomical model assembly of the human head for use in teaching medical personnel certain medical procedures, said assembly comprising:
   a rigid base molded into the shape that includes an anatomically correct representation of a human skull, mandible and nose cartilage;
   a muscle mask covering said base, wherein said muscle mask has an exterior on which is provided an anatomically correct representation of at least some muscle groups contained within a human head, wherein said muscle mask is stretched over said base and is selectively removable from said base, therein enabling said muscle mask to be manually pulled away from said base in a selected area; and
   a skin mask covering said muscle mask, wherein said skin mask has an exterior that is shaped with at least some human facial features, and wherein said skin mask varies in thickness at different anatomical points to mimic an average skin thickness for such anatomical points on a human head;
   wherein said skin mask is stretched over said muscle mask, therein placing said skin mask and said muscle mask in direct contact.

2. The assembly according to claim 1, wherein said skin mask is elastomeric.

3. The assembly according to claim 2, wherein said skin mask is an elastomeric gel.

4. The assembly according to claim 1, wherein said skin mask is translucent.

5. The assembly according to claim 4, wherein said muscle mask is fabricated from a translucent elastomeric gel.

6. The assembly according to claim 5, further including a light source for internally illuminating said base, said muscle mask and said skin mask.

7. The assembly according to claim 1, wherein said at least some muscle groups on said exterior of said muscle mask are selected from a group comprising the epicranius, frontalis, occipitallis, orbicularis oris, zygomaticus major, levator labii superioris, depressor labii inferioris, buccinator, mentalis, platysma, risorius and orbicularis oculi.

8. The assembly according to claim 1, wherein said skin mask is stretched over said muscle mask and is selectively removable from said first layer.

9. The assembly according to claim 1, wherein some of said facial features present on said second layer of material are molded with features that mimic skin defects, wherein said features are selected from a group consisting of wrinkles, pock depressions, lesions, and moles.

10. An anatomical model assembly of the human face for use in teaching medical personnel certain medical procedures, said assembly comprising:
    a base generally shaped as a facial skeleton, wherein at least some of said base is translucent;
    a light source disposed within said base that internally illuminates said base with light;
    a molded muscle mask of elastomeric material stretched over said base, wherein said molded muscle mask has an exterior molded to contain representations of facial muscles that are visually anatomically correct, wherein said molded muscle mask is separate from said base and can be manually pulled away from said base at different points, and wherein said muscle mask is translucent so that light from said light source internally illuminates said muscle mask through said base; and
    a skin mask of elastomeric material that presents a visual representation of facial features, wherein said skin mask is stretched over said muscle mask, and wherein said skin mask is translucent so that light from said light source internally illuminates said skin mask through both said muscle mask and said base.

11. The assembly according to claim 10, wherein some of said facial features present are molded in said skin mask and mimic skin defects.

12. The assembly according to claim 10, wherein said skin mask varies in thickness from point to point to simulate different skin thicknesses on a real human face.

* * * * *